June 28, 1960 E. HAJOS 2,942,874
APPARATUS FOR FOLDING
Filed July 24, 1957
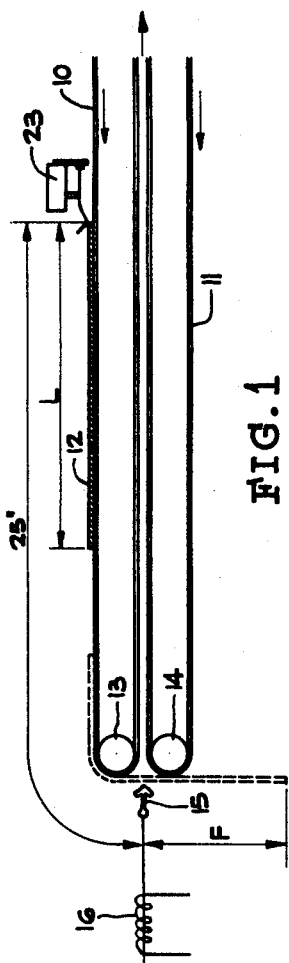
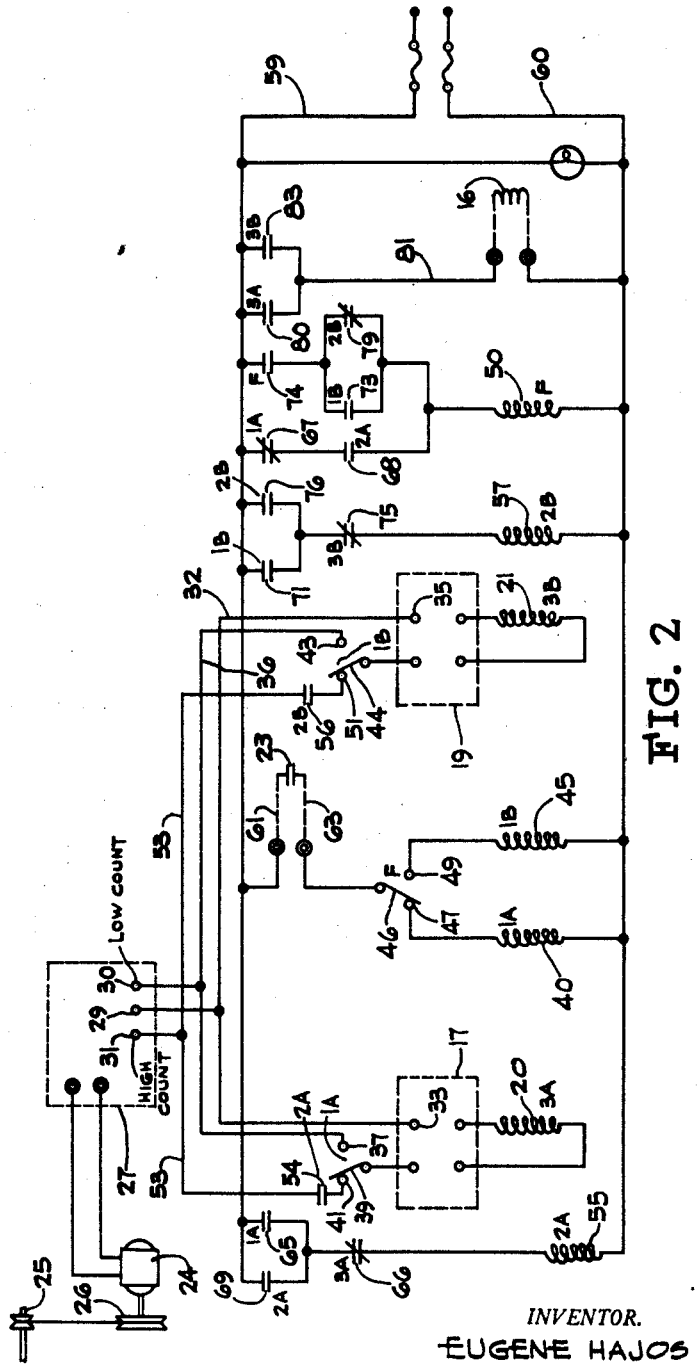
INVENTOR.
EUGENE HAJOS
BY
ATTORNEYS

United States Patent Office 2,942,874
Patented June 28, 1960

2,942,874
APPARATUS FOR FOLDING

Eugene Hajos, Chicago, Ill., assignor, by mesne assignments, to Hydraxtor Company, Skokie, Ill., a corporation of Illinois Filed July 24, 1957, Ser. No. 673,822

7 Claims. (Cl. 270—83)

This invention relates to improvements in a method and apparatus for measuring predetermined lengths of an article.

A principal object of the invention is to provide a novel and improved form of method and apparatus for measuring predetermined lengths of a traveling article by counting at a rate proportionate to the rate of travel of the article.

A further object of the invention is to provide an improved form of apparatus for measuring predetermined lengths of a succession of traveling articles by counting at a rate proportionate to the rate of travel of the articles.

Still another object of the invention is to provide a novel measuring apparatus for measuring predetermined lengths of a succession of traveling articles, spaced at random, using two alternately operable counters, one operable to measure a length of a first article by counting and the other operable to measure a length of a next succeeding article by counting.

A further object of the invention is to provide a novel and improved apparatus for measuring the length of a traveling article and effecting a folding operation thereof, utilizing a counter energized to count at one rate during traveling of the article past an energizing switch therefor, and to thereafter count at a higher rate and effect a tucking operation at the termination of a predetermined number of counts.

A still further object of the invention is to provide a simplified and improved form of counter timer for actuating tucking means for effecting the folding of a succession of traveling articles spaced at random, by a tucking operation effected by two electronic counters, one counting upon the passing of the first article past an energizing switch therefor and the other counting upon the passing of a second article past the same energizing switch, each operating a common tucking device to effect folding of the article intermediate the ends thereof, and each increasing its rate of counting upon passing of the article past the actuating switch therefor to evenly divide the article, together with means for transferring from one counter to the other at the termination of the operation of measuring a first article by the first counter.

These and other objects of the invention will appear from time to time as the following specification proceeds and with reference to the accompanying drawings wherein:

Figure 1 is a diagrammatic view illustrating a folding device for articles of linen and the like; and Figure 2 is a schematic wiring diagram diagrammatically illustrating a timer and tucking energizing circuit constructed in accordance with the invention, to effect tucking and folding of measured lengths of articles of linen and the like.

In the embodiment of the invention illustrated in Figures 1 and 2 of the drawings, I have shown two vertically spaced endless traveling belts 10 and 11, the belt 10 carrying an article 12 to a folding station and the belt 11 being spaced below the belt 10 and carrying the folded article for stacking.

The belts 10 and 11 are diagrammatically shown as traveling in opposite directions and respectively change their directions of travel about rolls 13 and 14, at a folding station. The rolls 13 and 14 and the belts 10 and 11, changing their directions of travel thereabout, may therefore serve as folding rolls to fold an article tucked therebetween. It should here be understood that while I have shown the belts 10 and 11 trained about the folding rolls 13 and 14 that separate folding rolls or any other folding means may be provided if desired.

I have also diagrammatically shown a tucking blade 15 operable to engage the article 12 at its mid-point when traveling over the end of the belt 10 and tuck the article between the folding rolls 13 and 14 and thereby fold the article in half to be conveyed between the belts 10 and 11 away from the folding station by the belt 11, to a stacking or like station.

The tucking blade 15 may be actuated upon the energization of the solenoid coil 16, to engage the article to be folded intermediate the ends thereof and tuck the same between the folding rolls 13 and 14 and the belts 10 and 11 traveling thereabout, upon energization of the solenoid coil 16.

I have also shown in Figure 2, two successively operable electronic counters 17 and 19. Said counters 17 and 19 may each count to 100 and then energize relay coils 20 and 21, respectively. The count of 100 is an arbitrary count used for the purposed of describing the invention, and need not be 100, but may be any count desired.

The counters 17 and 19 each count at a rate of 2 counts per inch of belt travel as the article 12 passes under an article length detecting means, such as a switch 23, and then count at double the counting rate or 4 counts per inch of belt travel when the article has passed by the article length detecting switch 23. It should be understood the counts herein referred to are illustrative only, and that the counts per inch may be varied if desired. The article length detecting switch 23 is a normally open switch closed by engagement of the leading end of the article 12 therewith and remaining closed as long as the article is passing thereunder.

It should be understood, however, that the article length detecting means need not necessarily be a switch and need not be operated by direct engagement with the article to be folded, but may be any form of circuit closing device and may be operated in various well known manners, such as the breaking of a light beam projected onto a photoelectric cell or like device.

As a first article comes up to the switch 23 and its leading end effects closing of said switch, the counter 17 will be energized to count at the rate of 2 per inch of belt and article travel as long as the article 12 is under the switch 23. As the article 12 passes by the article length detecting switch 23, the counting rate will be increased to 4 per inch of belt travel until the article has proceeded past the folding rolls 13 and 14 and half of the article hangs below the center of the tucking blade 15. At this instant, the count of 100 will have been reached. This will effect energization of the relay coil 20 connecting the solenoid coil 16 in an energizing circuit, to instantaneously operate the tucking blade to tuck the article 12 between the folding rolls 13 and 14 and be folded in half thereby, to be carried away between the belts 10 and 11 to a stacking position of the machine. Energization of the relay coil 20 will also deenergize and reset the counter 17 for the next succeeding operation.

As a next succeeding towel comes under the switch 23, the counter 19 will be energized to count at the rate of two per inch of belt and article travel as long as the article 12 is under the switch 23, and to count at the rate of four per inch of belt and article travel as the tail end of the article passes by the switch 23. When a count of 100 is reached the counter 19 will energize a relay coil 21, which will connect the solenoid coil 16 in the energizing circuit to effect the tucking of a next succeeding article between the folding rolls 13 and 14.

The purpose of providing two counters 17 and 19 to count successive articles traveling along the belt 10, is to make it possible for articles to be placed on the belt 10 at small and random spacings, it being understood that the two counters 17 and 19 may be in operation together to effect counting of successive articles, the first counter being deenergized as soon as the count 100 is reached and the tucker solenoid 16 is energized, and the second counter continuing to count to 100 and then being deenergized, as will hereinafter more clearly appear as this specification proceeds.

It will be understood from the foregoing that the switch 23 initiates counting by either of the counters 17 or 19 at the rate of 2 per inch of belt and article travel as long as the article is under the switch 23 and that the doubling of the counting rate effects the division of the article in half as the count 100 is reached as will be evident from the following mathematical relations:

Let $L$=towel length in inches, which may be variable.
Let $F$=the distance the towel or article hangs below the center of the folding blade 15.
Expressing F in terms of L.
Total counts in all cases=100.
Rate of counting:
    2 counts per inch for L
    4 counts per inch for $F+(25-L)$
where 25 is the distance from the switch 23 to the center of the folding blade 15.

$$100=4F+4(25-L)+2L$$

F therefore equals ½ L.

It may be seen from this that since F is always ½ L, that the article 12 is always folded in half regardless of its length.

The relays associated with the respective counters 17 and 19, and switching the counting circuit from one counter to the other, as the successive articles on the belt 10 pass along the article length determining switch 23, may be electronic relays as well as electromagnetic relays, and may be of any well known form, so need not be shown or described in detail herein. In order to show at a glance the sequence of operation of the various relays and the association between the counters 17 and 19 and the respective relays, the relay coils and contacts operated thereby will be designated 1A, 2A, 3A and 1B, 2B and 3B in addition to the individual reference numerals applied thereto. The flip flop relay will also be designated by letter F in addition to its reference numeral.

Referring now to Figure 2, the counters 17 and 19 may be conventional electronic counters of any well known form, and preferably are conventional flip flop electronic counters. A suitable type of counter that may be used is the Model 700 Decimal Counter manufactured by Berkeley Scientific Company, Richmond, California. Said counters therefore need not herein be shown or described in detail. It should also be understood that while I herein preferably use conventional electronic counters, that the counters need not be electronic counters, but may be any form of counter which will count at a required rate per inch of belt travel and will then count at an increased rate per inch of belt travel as the article to be folded passes by the control switch therefore, and will energize a relay or equivalent device at the count of 100 to actuate the tucking blade 15 to effect a folding operation as will hereinafter more clearly appear as this specification proceeds.

A source of supply of pulsing current to the counters 17 and 19 is herein shown as being provided by an alternating current rate or pulse generator 24, which may be driven from the conveyor belt 10 through a shaft 25 and a belt drive generally indicated by reference character 26. The rate generator 24 may be a conventional form of generator, delivering current at a frequency of a predetermined number of cycles per second, which in the present instance may be 48 cycles per second. The rate generator 24 has connection with an impulse unit 27 which will deliver pulses at one rate per second and will also deliver pulses at double the rate per second. In the present instance, I utilize an impulse doubler unit which will deliver 48 pulses per second through terminals 29 and 30 and will deliver 96 pulses per second through terminals 29 and 31.

The pulsing rates of 48 and 96 per second with a belt speed of 120 feet per minute produce the counts of 2 and 4 per inch of belt travel previously discussed. It should be understood, however, that the pulsing rates and total count may be increased or decreased in the same ratio for any fixed belt speed without departing from the principles of the invention.

The impulse doubler unit 27 may be of a conventional form of unit known to those skilled in the art. It may, for example, comprise a saturable reactor like that described in Geyger "Magnetic-Amplifier Circuits", chapter 16, section 16.2, beginning on page 219, or other device capable of developing a peaked wave form, which may be fed to a half-wave rectifier to develop the low frequency signal and to a full wave rectifier to develop the double frequency signal.

Instead of using a frequency doubler, a frequency divider such as a multivibrator may be used, or two separate rate generators may be used, operating at the two different frequencies.

The terminal 29 serves as a common terminal for pulses delivered through either of the terminals 30 or 31, and has connection with a conductor 32 connected with a terminal 33 of the counter 17, and with a terminal 35 of the counter 19. The terminal 30 has connection with a conductor 36 connected with a contact 37 engageable with a movable relay switch arm 39, upon closing of the article length switch 23, completing an energizing circuit to a relay coil 40, to effect the movement of the switch arm 39 from its biased position in engagement with a stationary contact 41 into engagement with the stationary contact 37.

The conductor 36 also has connection with a stationary contact 43 engaged by a movable relay switch arm 44, upon energization of relay coil 45, as the article length switch 23 is closed and a movable relay switch arm 46 moves out of its biased position in engagement with a stationary contact 47 into engagement with a stationary contact 49 to complete an energizing circuit to the relay coil 45 when an article passes under switch 23. Movement of the relay switch arm 46 out of its biased position shown in Figure 2 into engagement with the stationary contact 49 is effected by energization of a relay coil 50 operating said switch when energized. The circuit to said relay coil will more clearly appear as this specification proceeds. Energization of the relay coil 45 will disengage the switch arm 44 from a stationary contact 51 and will move said switch arm into engagement with the stationary contact 43 to feed 48 pulses per second to the counter 19 and effect counting by said counter at a predetermined rate, which may be two counts per inch of belt travel.

The terminal 31 has connection with a conductor 53, connected with a normally open relay switch 54, closed upon energization of a relay coil 55 to complete an energizing circuit to the counter 17 through the stationary contact 41 and the movable switch 39, as the article length switch 23 opens and the relay coil 40 is deenergized, to double the number of impulses per second put into the counter 17, and thereby to double the rate of counting of said counter per inch of belt travel.

The conductor 53 is also connected with a relay switch 56, normally open and closed upon the energization of a relay coil 57, to energize the counter 19 through the stationary contact 51 and movable switch arm 44 to double the pulses per second put into the counter 19 and thereby double the count per inch of belt travel.

It should here be understood that as a first article 12 comes under the switch 23 that the relay coil 40 will be energized to move the switch arm 39 out of engagement with the stationary contact 41 into engagement with the stationary contact 37, and thereby to effect a count of two per inch of belt travel, and that when the article 12 passes by the article length switch 23 the coil 40 will be deenergized releasing the switch arm 39 to move to its biased position into engagement with the stationary contact 41 to double the pulses per second put into the counter 17 through the closed relay switch 54 as will hereinafter more clearly appear as the specification proceeds.

In a contrary manner as a next succeeding article passes under the switch 23, and closes said switch, the counter 19 is first energized through the stationary contact 43 and movable switch arm 44, upon energization of the relay coil 45, to effect counting at 2 counts per inch of belt travel and is then energized through the stationary contact 51 and movable contact arm 44 to effect a count of four per inch of belt travel as the switch 23 opens and the relay switch 56 closes, effected by the previous energization of the relay coil 57.

Main line conductors 59 and 60 connected with a source of supply of alternating current are provided to energize the relay coils 40, 45, 50, 55 and 57 and the solenoid 16 under control of the switch 23 and the various relay switches operated by said relay coils. The conductor 59 is connected with the article length switch 23 through a conductor 61. The article length switch 23 is connected with the conductor 60 through a conductor 63, connected from said article length switch 23 to either of the relay coils 40 or 45 through the movable switch arm 46 and stationary contacts 47 or 49, it being understood that the switch arm 46 is biased into position to engage the stationary contact 47 and energize the relay coil 40 as the article length switch 23 is closed, and moves into position to connect the relay coil 45 in the energizing circuit upon energization of the relay coil 50.

The relay coil 55 is energized through the conductors 59 and 60 through a normally closed relay switch 66 opened by the relay coil 20, a relay switch 65 closed by the relay coil 40 and a holding relay switch 69 closed by the relay coil 55.

The relay coil 50 is energized through normally closed contacts of a relay switch 67 opened by the relay coil 40 and the contacts of a relay switch 68, closed by the relay coil 55.

The relay coil 57 is energized through the contacts of a relay switch 71 closed by the relay coil 45 and the normally closed contacts of a relay switch 75 opened by the relay coil 21. The relay coil 57 is held energized through the contacts of a relay switch 76 closed by the relay coil 57.

The coil 50 is held energized during counting at the rate of two per inch of belt travel by the counter 19 by the contacts of a normally open relay switch 74 closed by the relay coil 50, and the normally open contacts of a relay switch 73 closed by the relay coil 45. Normally closed contacts of a relay switch 79, opened by the relay coil 57 are provided to hold the relay coil 50 energized during the initial change over to the counter 19, prior to closing of the switch 23, in cases where the counter 17 and relay coils 40 and 55 may be deenergized.

Referring now to the operation of the device, as the leading end of an article to be folded passes under the switch 23, said switch will close and effect energization of the relay coil 40 through the movable switch arm 46, biased into engagement with the stationary contact 47. This will effect movement of the movable switch arm 39 into engagement with the stationary contact 37 to feed a predetermined number of pulses per second to the counter 17, which may be 48 pulses per second. The counter 17 will then count at a rate of two per inch of belt travel.

Energization of the relay coil 40 will also close the contacts of the relay switch 65 and effect energization of the relay coil 55 through the normally closed relay switch 66. This will close the contacts of the holding relay switch 69 and hold the relay coil 55 energized until opening of the contacts of the relay switch 66 as a count of 100 is reached. It will also close the contacts of the relay switch 68. Energization of the relay coil 40 will also open the normally closed contacts of the relay switch 67 prior to closing of the contacts of the relay switch 68. This will hold the relay coil 50 out of the energizing circuit until deenergization of the relay coil 40 and closing of the contacts of the relay switch 67.

As the article to be measured passes by the article length switch 23, the contacts of said switch will open. This will deenergize the relay coil 40 and effect the opening of a circuit to the counter 17 through the stationary contact 37 and the closing of a circuit to said counter through the stationary contact 41. It will also effect opening of the contacts of the relay switch 65 and closing of the contacts of the relay switch 67. At this time the contacts of the holding relay switch 69 will maintain the coil 55 energized, to hold the relay contacts 54 and 68 closed.

The counter 17 will now be energized at double the number of pulses per second, which in the present instance may be 96 pulses per second. The counter will then count at a rate of four per inch of belt travel, since the belt speed is 24 inches per second.

The closing of the contacts of the relay switch 67 upon deenergizing of the relay coil 40 and the holding closed of the contacts of the relay switch 68 will now energize the coil 50. This will move the movable switch arm 46 out of engagement with the stationary contact 47 into engagement with the contact 49 to establish an energizing circuit to the relay coil 45. The contacts of a relay switch 74 operated by the relay coil 50 will also close, then as the leading edge of a next successive article to be folded passes under the article length switch 23, said switch will close, energizing the relay coil 45. This will close the contacts of relay switches 71 and 73. Closing of the relay contacts 74 upon the previous energization of the relay coil 50 and closing of the relay contacts 73 upon energization of the relay coil 45 will establish a holding circuit to hold the relay coil 50 energized and hold the movable switch arm 46 into engagement with the stationary contact 49 through the contacts of the relay switches 73 and 74.

During the switch over time from the counter 17 to the counter 19, the counter 17 may still be energized to count at a rate of four per inch of belt travel, the counter 17 being held in its energizing circuit by the relay coil 55 energized through the holding relay switch 69 and holding the contacts of the relay switch 54 closed.

The counter 19 will then commence to count at a rate of two per inch of belt travel until the article passes beyond the article length switch 23 and said switch opens. When relay coil 45 was previously energized, the relay coil 57 also was energized through the contacts of the relay switch 71, and through the normally closed contacts of a relay switch 75, opening upon the energization of the relay coil 21 at a count of 100 by the counter 19. The relay switch 75 serves to reset the circuit to the relay coil 57 at the termination of a counting operation. Energization of the relay coil 57 will also effect the closing of holding contacts of a holding relay switch 76 holding the relay coil 57 energized upon deenergization of the relay coil 45 and opening of the contacts of the relay switch 71. Energization of the relay coil 57 will also effect closing of the contacts of the relay switch 56, to condition the circuit to the counter 19, to double the rate of counting thereof as the article passes by the article length switch 23, and the relay coil 45 is deenergized. Energization of the relay coil 57 will also open the normally closed contacts of a relay switch 79 connected in parallel with the normally open contacts of the relay switch 73.

The counter 19 has now been connected in the circuit to count at the rate of two per inch of belt travel, while the counter 17 may still be connected in the circuit to count at the rate of four per inch of belt travel, depending upon the spacing between the articles on the belt 10.

As the counter 17 counts at a double rate and the count of 100 is reached, the relay coil 20 will be momentarily energized. This will open the contacts of the relay switch 66 and deenergize the relay coil 55, resetting the circuit. This will also close the contacts of a relay switch 80 and energize the tucking solenoid 16 through a conductor 81. This will immediately effect the dividing and tucking of the article to be folded between the folding rolls 13 and 14 and the belts thereon, to effect the folding of the article 12. As herein shown, the relay coil 20 is energized for a predetermined time interval, which may be one tenth of a second and is sufficiently long to reset the circuit to the counter 17 and to effect energization of the solenoid coil 16 to operate the tucker blade 15.

The counter 19 now continues to count the next successive article to be folded at a rate of two counts per inch of belt travel.

When the next successive article 12 passes by the article length switch 23, the switch 23 will open. This will deenergize the relay coil 45 and effect the movement of the switch arm 44 into its biased position into engagement with the stationary contact 51, and the opening of the contacts of the relay switches 71 and 73. The relay coil 50 will then be deenergized and the switch arm 46 will move back to its biased position into engagement with the contact 47. The relay coil 57 will, however, be held energized through the holding relay switch 76, and the contacts of the relay switch 56 will be held closed by the relay coil 57, to feed double the rate of pulses per second to the counter 19, and thereby double the rate of counting of said counter. The counter 19 will then continue to count at a rate of four per inch of belt travel per second until a count of 100 is reached. As the counter 19 counts to 100, the relay coil 21 will be momentarily energized. This will effect opening of the normally closed switch 75 and deenergization of the relay coil 57. It will also effect the closing of the solenoid for the tucker blade 15 through the contact 83, to effect tucking of the article 12 between the folding rolls 13 and 14 at its exact center.

The circuit has now been reset and is in condition to continue the counting tucking and folding operation by operation of the counter 17.

While I have herein shown and described one form in which my invention may be embodied, it should be understood that I do not wish to be limited to the specific form shown, and that various modifications and variations in the invention may be effected without departing from the spirit and scope of the novel concepts thereof, except as limited by the claims appended hereto.

I claim as my invention:

1. In a device particularly adapted to measure and divide a traveling article, an electronic counter arranged to respond to electrical impulses to develop an electrical output signal upon application of a predetermined number of electrical impulses thereto, an electrical impulse unit arranged to develop a first series of electrical impulses at one rate per unit of travel of the article and a second series of impulses at a higher rate per unit of travel of the article, means responsive to passing of the article to one central position, for applying said first series of electrical impulses to said counter and responsive to the passing of the article past this central position for applying said second series of electrical impulses to said counter to effect counting at a higher rate, and electrical energizable means energizable by said counter at the termination of counting at said second counting rate for effecting a dividing operation on the traveling article.

2. In a device particularly adapted to measure and divide a traveling article, an article dividing means, a plurality of electronic counters, each being arranged to respond to electrical impulses to develop an electrical output signal upon the application of a predetermined number of electrical impulses thereto and to alternately control operation of said article dividing means, an electrical impulse unit arranged to develop a first series of electrical impulses at one rate per unit of travel of an article thereby and a second series of impulses at a higher rate per unit of travel of the article, article detecting means responsive to the passing of an article thereto for applying said first series of electrical impulses to a first counter, and responsive to the passing of the article past said article length detecting means for applying said second series of electrical impulses to said first counter to effect counting at a higher rate, and to apply said first series of electrical impulses to said second counter responsive to the passing of a next succeeding article to said article length detecting means, and to apply said second series of electrical impulses to said second counter upon the passing of the next succeeding article thereby, and means successively energized by said counters at the termination of counting at said second counting rate for actuating said article dividing means.

3. In a device particularly adapted to measure and divide a traveling article, relay means, first and second electrically responsive counters arranged to respond to electrical impulses to develop an electrical output signal upon application of a predetermined number of electrical impulses thereto and to successively energize said relay means at the termination of counting, to effect successive dividing operations of the traveling article, an electrical impulse unit arranged to develop a first series of electrical impulses at one rate per unit of travel of the article and a second series of electrical impulses at a higher rate per unit of travel of the article, article length detecting means comprising a normally open switch and electrically energizable relay means energized thereby upon the closing of said switch for electrically connecting a first counter to said impulse unit to effect counting at one rate per unit of travel of the article and for electrically connecting said first counter to said impulse unit for counting at a higher rate as the article passes by said article length detecting means, and to connect said second counter to said electrical impulse unit to effect counting at one rate during counting of said first counter at a higher rate, and to count at a higher rate as the article has passed by said article length detecting means, and electrical energizing circuits from said first and second counters to said first mentioned relay means for successively energizing said first mentioned relay means to effect an article dividing operation at the termination of counting by said first and second counters.

4. In a device particularly adapted to measure lengths of a succession of traveling articles comprising an article length detecting device including a switch closing as an article passes thereby and opening as the article has passed thereby, first and second electronic counters, each counter being arranged to respond to electrical impulses to develop an electrical output signal upon application of a predetermined number of electrical impulses thereto, an impulse unit arranged to develop a first series of electrical impulses at one rate per unit of travel of the article and a second series of electrical impulses at a higher rate per unit of travel of the article, input connections from said impulse unit to said first and second counters for effecting successive counting by said counters at one rate upon the passing of an article to and along said article length detecting device and the closing of said switch, and then to count at a higher rate as the article passes by said switch and said switch opens, relay means connecting said second electronic counter with said impulse unit upon the closing of said switch as a next succeeding article passes therealong, an individual relay in association with each of said electronic counters and energized thereby at the termination of a counting operation thereof and operable to effect the disconnection of an associated counter from said impulse unit at the termination of a counting operation and to effect an article length measuring operation.

5. In a device for folding articles of linen and the like, an endless belt, a roll at one end of said belt, a second roll spaced beneath said roll, a tucking device tucking an article to be folded in the space between said rolls to be folded thereby, means dividing an article to be folded and operating said tucking device to tuck the article between said rolls at the point of division thereof, comprising an article length detecting device including normally open switch means closing upon the passing of articles thereby, an electronic counter arranged to respond to electrical impulses to develop an electrical output signal upon the application of a predetermined number of electrical impulses thereto, an electrical impulse unit arranged to develop a first series of electrical impulses at one rate per unit of travel of the article and a second series of electrical impulses at a higher rate per unit of travel of the article, means responsive to the closing of said switch for applying said first series of electrical impulses to said counter and responsive to the opening of said switch after an article has passed by said article length detecting device for applying said second series of electrical impulses to said counter, and other electrically energizable means energized by said counter at the termination of counting at a higher rate, for operating said tucking device to engage the article to be folded intermediate the ends thereof and tuck the article between said rolls to be folded thereby.

6. In a device for folding articles of linen and the like, an endless belt, a roll at one end of said belt, a second roll spaced beneath said roll, a tucking device tucking an article to be folded in the space between said rolls to be folded thereby, an electrically energizable means dividing the article to be folded in half and operating said tucking device to tuck the article between said rolls at its mid-point, comprising an article length detecting device including a normally open switch disposed along said belt, closing upon the passing of the leading end of an article to be counted thereby, an electronic counter energized to respond to electrical impulses to develop an electrical output signal upon application of a predetermined number of electrical impulses thereto, an electrical impulse unit arranged to develop a first series of electrical impulses at one rate per unit of travel of the article and a second series of electrical impulses at a higher rate per unit of travel of the article, means operated upon the closing of said switch responsive to the leading edge of the article passing thereby for connecting said counter with said impulse unit to effect counting a predetermined number of pulses per second, other means operated upon the opening of said switch upon the passing of the article thereby to connect said counter with said impulse unit to double the rate of pulses fed to said counter, means actuated by said counter at the termination of counting at a double rate, for operating said tucking device to engage the article to be folded intermediate the ends thereof and to tuck the article between said rolls to be folded thereby, comprising a solenoid energizable to effect operation of said tucking device, and a relay having a coil energized by the development of said electrical output signal of said counter upon the termination of a predetermined number of counts, said relay having a switch closed upon the energization of said coil to effect energization of said solenoid.

7. In a device for folding articles of linen and the like, two vertically spaced endless belts having direction changing rolls at opposite ends thereof, a tucking device for tucking an article to be folded in the space between said belts, an article length detecting device including a normally open switch disposed along the uppermost of said belts, closing upon the passing of the leading end of an article to be folded thereby and opening as the article passes by said switch, first and second electronic counters, each counter arranged to respond to electrical impulses to develop an electrical output signal upon application of a predetermined number of electrical impulses thereto, an electrical impulse unit arranged to develop a first series of electrical impulses at one rate per unit of travel of the article and a second series of electrical impulses at a higher rate per unit of travel of the article, means operated responsive to the closing of said switch for applying said first series of electrical impulses to a first counter and operated in response to opening of said switch to apply said second series of electrical impulse units to said first counter and to apply a first series of electrical impulses to said second counter as the leading edge of a next succeeding article effects the closing of said switch, a holding relay electrically associated with each counter and holding said counters energized to count at a higher rate to the termination of a counting operation as the other counter is energized to count at a lower rate, separate relays electrically associated with each counter and each having a coil energized at the termination of the application of a predetermined number of electrical impulses thereto and having contacts deenergizing said holding means and resetting the counter associated therewith, and having other contacts closing to effect operation of said tucking device.

References Cited in the file of this patent

UNITED STATES PATENTS

| | | |
|---|---|---|
| 2,374,779 | Preston | May 1, 1945 |
| 2,652,197 | Berger | Sept. 15, 1953 |
| 2,656,109 | Lindars | Oct. 20, 1953 |
| 2,659,598 | McClogan | Nov. 17, 1953 |
| 2,673,686 | Hoffman | Mar. 30, 1954 |
| 2,740,045 | Bivens | Mar. 27, 1956 |
| 2,774,592 | Kogan | Dec. 18, 1956 |
| 2,777,689 | Martin | Jan. 15, 1957 |